US010394112B2

(12) United States Patent
Johnson et al.

(10) Patent No.: US 10,394,112 B2
(45) Date of Patent: Aug. 27, 2019

(54) VEHICLE INCLUDING VIDEO PROJECTOR MOUNTED TO LIFT GATE OR ROOF

(71) Applicant: FORD GLOBAL TECHNOLOGIES, LLC, Dearborn, MI (US)

(72) Inventors: Aaron Bradley Johnson, Allen Park, MI (US); Stephen Kenneth Helwig, Farmington Hills, MI (US); Stuart C. Salter, White Lake, MI (US); Paul Kenneth Dellock, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/491,183

(22) Filed: Apr. 19, 2017

(65) Prior Publication Data

US 2018/0304820 A1 Oct. 25, 2018

(51) Int. Cl.

| | |
|---|---|
| *G03B 29/00* | (2006.01) |
| *G03B 21/00* | (2006.01) |
| *H04N 9/31* | (2006.01) |
| *A01M 1/04* | (2006.01) |
| *A01M 1/22* | (2006.01) |
| *B60R 11/00* | (2006.01) |

(Continued)

(52) U.S. Cl.
CPC ............. *G03B 29/00* (2013.01); *A01M 1/04* (2013.01); *A01M 1/223* (2013.01); *B60R 11/00* (2013.01); *B60R 21/16* (2013.01); *G03B 21/00* (2013.01); *H04N 9/3141* (2013.01); *B60J 5/10* (2013.01); *B60R 11/02* (2013.01); *B60R 2011/0021* (2013.01); *B60R 2011/0294* (2013.01)

(58) Field of Classification Search
CPC ............. B60R 11/02; B60R 2011/0021; B60R 2011/0294; A01M 1/04; A01M 1/223; H04N 9/3173; B60J 5/10; G03B 29/00
See application file for complete search history.

(56) References Cited

U.S. PATENT DOCUMENTS 2,023,845 A * 12/1935 Larose ................. B60Q 1/2607
40/556
5,281,985 A 1/1994 Chan
(Continued)

FOREIGN PATENT DOCUMENTS

| CN | 202366470 U | 8/2012 |
|---|---|---|
| CN | 105015426 | 11/2015 |

(Continued)

OTHER PUBLICATIONS

Translation of DE 10 2006 036 061 A1 (Year: 2008).*
Translation of DE 10 2006 040 151 A1. (Year: 2008).*
Translation of KR 10-1734679 B1. (Year: 2017).*

*Primary Examiner* — Sultan Chowdhury
*Assistant Examiner* — Magda Cruz
(74) *Attorney, Agent, or Firm* — Carlson, Gaskey & Olds, P.C.

(57) ABSTRACT

A vehicle according to an exemplary aspect of the present disclosure includes, among other things, a liftgate rotatable between a closed position and an open position, and a video projector mounted to the liftgate. Further, the video projector is configured to project video in a direction away from the vehicle when the liftgate is in the open position. This disclosure also relates to a video projector operable in a video projection mode and a secondary mode, and further relates to a method.

19 Claims, 9 Drawing Sheets

(51) Int. Cl.
  *B60R 21/16* (2006.01)
  *B60R 11/02* (2006.01)
  *B60J 5/10* (2006.01)

(56) References Cited

U.S. PATENT DOCUMENTS

| | | | |
|---|---|---|---|
| 7,175,321 B1 * | 2/2007 | Lopez | B60Q 1/50 |
| | | | 296/21 |
| 7,466,843 B2 | 12/2008 | Pryor | |
| 8,733,938 B2 * | 5/2014 | Sachdev | B60R 1/00 |
| | | | 348/148 |
| 9,604,568 B1 * | 3/2017 | Salter | B60Q 1/323 |
| 9,827,901 B1 * | 11/2017 | Thompson | B60Q 1/34 |
| 2004/0046899 A1 * | 3/2004 | Bonnett | B60R 11/0211 |
| | | | 348/744 |
| 2004/0189947 A1 * | 9/2004 | Hattori | B60R 11/0235 |
| | | | 353/13 |
| 2006/0268233 A1 * | 11/2006 | Sato | G03B 21/10 |
| | | | 353/13 |
| 2009/0013922 A1 * | 1/2009 | Lin | B60Q 1/38 |
| | | | 116/28 R |
| 2009/0268164 A1 | 10/2009 | Bowden et al. | |
| 2011/0273671 A1 * | 11/2011 | Chu | G03B 21/14 |
| | | | 353/13 |
| 2015/0108299 A1 * | 4/2015 | Seal | F16M 13/022 |
| | | | 248/205.1 |
| 2015/0168721 A1 | 6/2015 | Yamasaki | |
| 2015/0197194 A1 * | 7/2015 | Salter | B60Q 1/2669 |
| | | | 362/510 |
| 2015/0298598 A1 * | 10/2015 | Nussli | B60Q 1/2665 |
| | | | 345/2.2 |
| 2016/0001700 A1 * | 1/2016 | Salter | B60Q 1/56 |
| | | | 362/510 |
| 2016/0236612 A1 | 8/2016 | Caron | |
| 2017/0130510 A1 * | 5/2017 | Nania | B62D 33/0273 |
| 2017/0210282 A1 * | 7/2017 | Rodriguez Barros | G03B 21/00 |
| 2017/0297502 A1 * | 10/2017 | Kim | B60R 11/00 |
| 2017/0329210 A1 * | 11/2017 | Zawacki | F21S 10/007 |
| 2018/0118099 A1 * | 5/2018 | Kunii | B60Q 1/04 |

FOREIGN PATENT DOCUMENTS

| | | | | |
|---|---|---|---|---|
| DE | 20018639 | U1 * | 1/2001 | ......... B60R 11/0235 |
| DE | 102006036061 | A1 * | 2/2008 | ............. B60Q 1/50 |
| DE | 102006040151 | A1 * | 3/2008 | ............. B60J 5/101 |
| DE | 102013021962 | A1 * | 6/2015 | ........... B60Q 1/2661 |
| KR | 101734679 | B1 * | 5/2017 | ............. B60R 11/02 |

* cited by examiner

VEHICLE INCLUDING VIDEO PROJECTOR MOUNTED TO LIFT GATE OR ROOF

BACKGROUND

This disclosure relates to a vehicle-mounted video projector.

In addition to being relied upon for transportation, automobiles are increasingly being used as entertainment accessories for tailgating, camping, and other outdoor activities. Further, vehicle infotainment systems have become robust, and are capable of interfacing with various mobile computing devices to allow users to consume various types of media within the vehicle, including music and video.

Vehicles are known to include flip-down or headrest-mounted video display screens. Additionally, some known vehicles include video projectors configured to project video on a screen in the vehicle interior. Less commonly, vehicles have been known to include the projectors configured to project video on a screen or wall surface provided outside the vehicle. In those examples, the projectors are mounted to the front of the vehicle, the roof of the vehicle, or within a vehicle cabin.

SUMMARY

A vehicle according to an exemplary aspect of the present disclosure includes, among other things, a liftgate rotatable between a closed position and an open position, and a video projector mounted to the liftgate. Further, the video projector is configured to project video in a direction away from the vehicle when the liftgate is in the open position.

In a further non-limiting embodiment of the foregoing vehicle, the video projector is operable in a video projection mode in which the video projector projects video and a secondary mode in which the video projector does not project video.

In a further non-limiting embodiment of any of the foregoing vehicles, when in the secondary mode, the video projector projects a light in a direction away from the vehicle body.

In a further non-limiting embodiment of any of the foregoing vehicles, the light is one of (1) a substantially white light configured to illuminate a space adjacent the vehicle and (2) a substantially yellow light configured to attract insects.

In a further non-limiting embodiment of any of the foregoing vehicles, the video projector includes a bezel assembly supporting a lens, and the bezel assembly is moveable relative to the liftgate.

In a further non-limiting embodiment of any of the foregoing vehicles, when the liftgate is in the closed position, the bezel assembly and lens project from the liftgate into a recess in a portion of the vehicle body.

In a further non-limiting embodiment of any of the foregoing vehicles, the bezel assembly includes electrically conductive material and completes an electrical connection with an electronic component mounted to the portion of the vehicle body.

In a further non-limiting embodiment of any of the foregoing vehicles, the portion of the vehicle body is a rear bumper.

In a further non-limiting embodiment of any of the foregoing vehicles, the bezel assembly includes a phosphor coating to attract insects to the bezel assembly.

In a further non-limiting embodiment of any of the foregoing vehicles, the video projector is powered by a vehicle battery.

In a further non-limiting embodiment of any of the foregoing vehicles, the video projector is controllable by a controller of the vehicle, and wherein a mobile device of a user is in communication with the controller.

In a further non-limiting embodiment of any of the foregoing vehicles, the controller is configured to send an alert to the mobile device when the vehicle battery state of charge is below a threshold.

In a further non-limiting embodiment of any of the foregoing vehicles, the mobile device is a smartphone.

Another vehicle according to an exemplary aspect of the present disclosure includes, among other things, a roof and a video projector mounted to the roof. The video projector is configured to project video in a direction away from a vehicle body. Further, the video projector is operable in a video projection mode in which the video projector projects video and a secondary mode in which the video projector does not project video.

In a further non-limiting embodiment of the foregoing vehicle, when in the secondary mode, the video projector projects a light in a direction away from the vehicle body.

In a further non-limiting embodiment of any of the foregoing vehicles, the light is one of a reverse light and a brake light.

In a further non-limiting embodiment of any of the foregoing vehicles, the light is one of (1) a substantially white light configured to illuminate a space adjacent the vehicle and (2) a substantially yellow light configured to attract insects.

A method according to an exemplary aspect of the present disclosure includes, among other things, rotating a liftgate of a vehicle to an open position, and projecting video from a video projector mounted to the liftgate in a direction away from the vehicle.

In a further non-limiting embodiment of the foregoing method, the method includes operating the video projector in a secondary mode in which the video projector does not project video. In the secondary mode, the video projector projects one of (1) a substantially white light configured to illuminate a space adjacent the vehicle and (2) a substantially yellow light configured to attract insects.

In a further non-limiting embodiment of any of the foregoing methods, the method includes rotating the liftgate to a closed position, and extending a bezel assembly and lens of the video projector from the liftgate into a recess in a rear bumper of the vehicle.

BRIEF DESCRIPTION OF THE DRAWINGS

FIG. 4 illustrates the vehicle of FIGS. 1 and 2 with a video projector being used in a secondary mode. In FIG. 4, the video projector functions as a floodlight.

FIG. 5 illustrates the vehicle of FIGS. 1 and 2 with a video projector being used in a secondary mode. In FIG. 5, the video projector functions as an insect-attracting light.

DETAILED DESCRIPTION

This disclosure relates to a vehicle-mounted video projector. In this disclosure, the video projector may be mounted to a vehicle liftgate, which is rotatable between a closed position and an open position. In one embodiment of this disclosure, the video projector is configured to project video in a direction away from the vehicle when the liftgate is in the open position. In a further embodiment of this disclosure, the video projector is mounted to a roof of a vehicle. In either embodiment, the video projector may be used in a video projection mode or a secondary mode. In the secondary mode, the video projector may function as a floodlight, insect-attracting light, bug zapper (more formally known as an electric insect killer), a reverse light, or a brake light, as examples. Accordingly, among other benefits, the video projector is a convenient and multi-purpose entertainment accessory.

Figure 1:
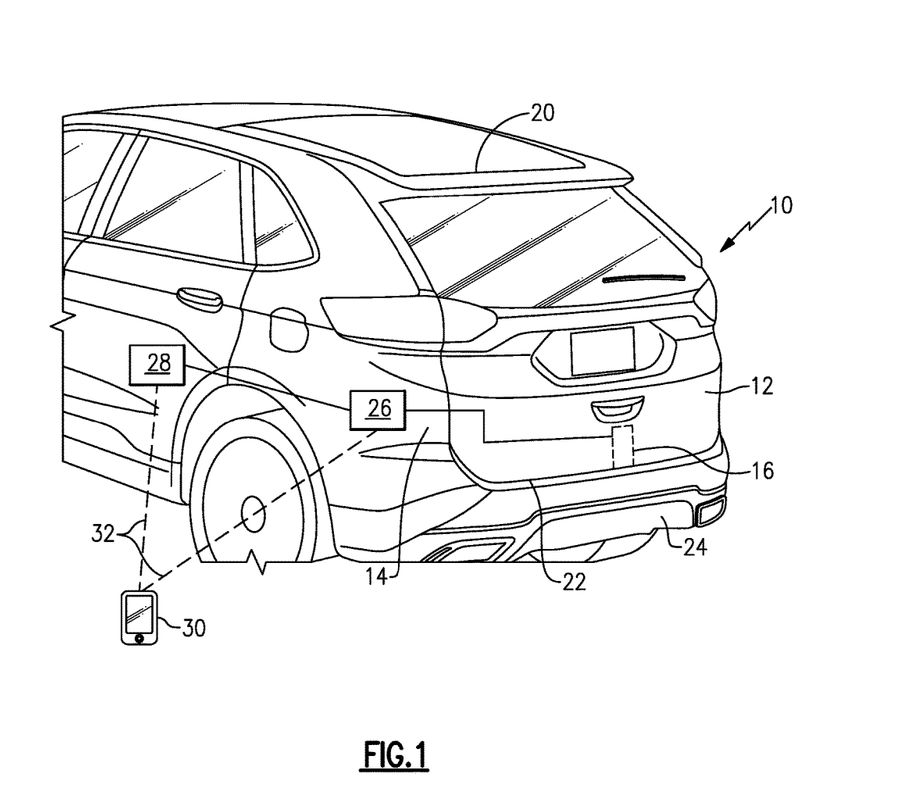
FIG. 1 is a rear-perspective view of a vehicle with a liftgate in a closed position.
Figure 2:
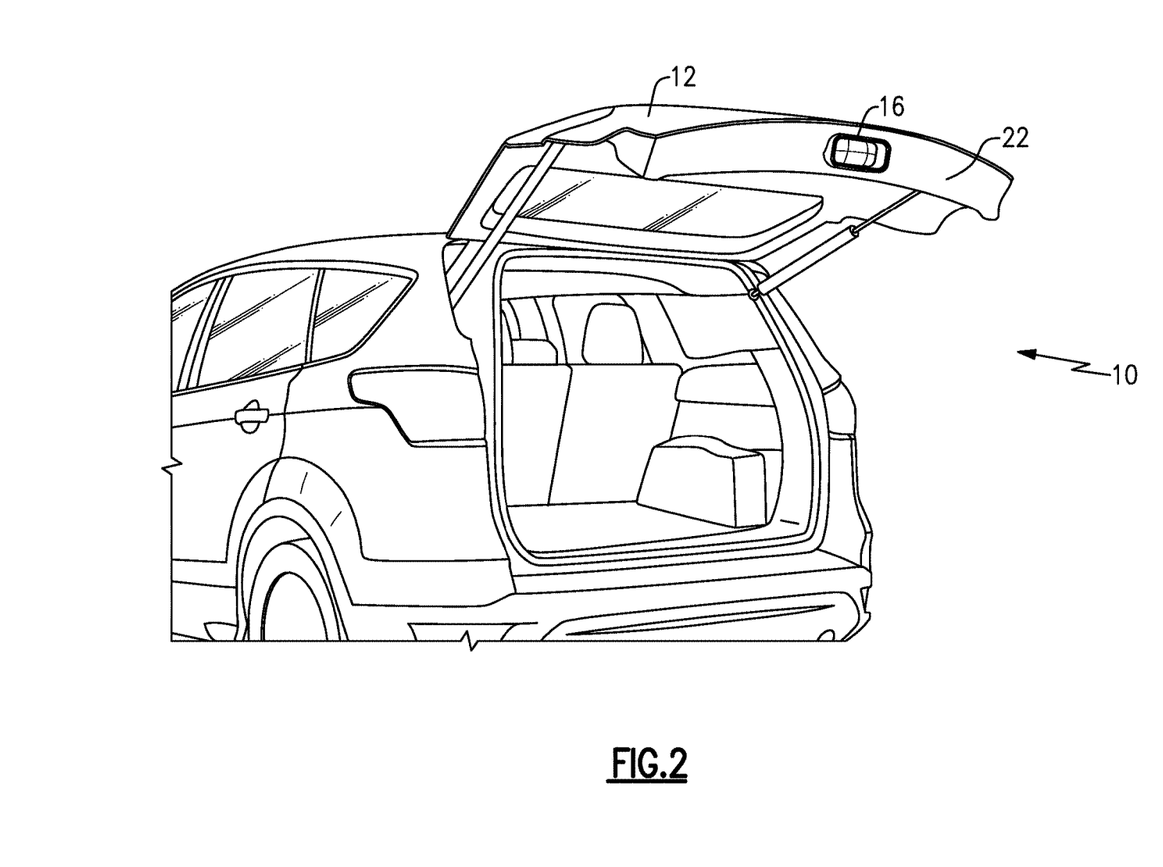
FIG. 2 is a rear-perspective view of the vehicle of FIG. 1 with the liftgate in a fully open position.

Referring to the drawings, FIG. 1 is a rear-perspective view of a vehicle 10, which is shown as a sport utility vehicle (SUV), including an example liftgate 12 rotatable relative to a vehicle body 14 between a closed position, as shown in FIG. 1, and an open position such as a fully open position, as shown in FIG. 2. While FIG. 1 shows an SUV, this disclosure is not limited to SUVs and extends to other types of vehicles, including cars, minivans, trucks, hatchbacks, etc. Further, as used in this disclosure, the vehicle body 14 refers to the frame (including pillars) and paneling of the vehicle 10.

Figure 3:
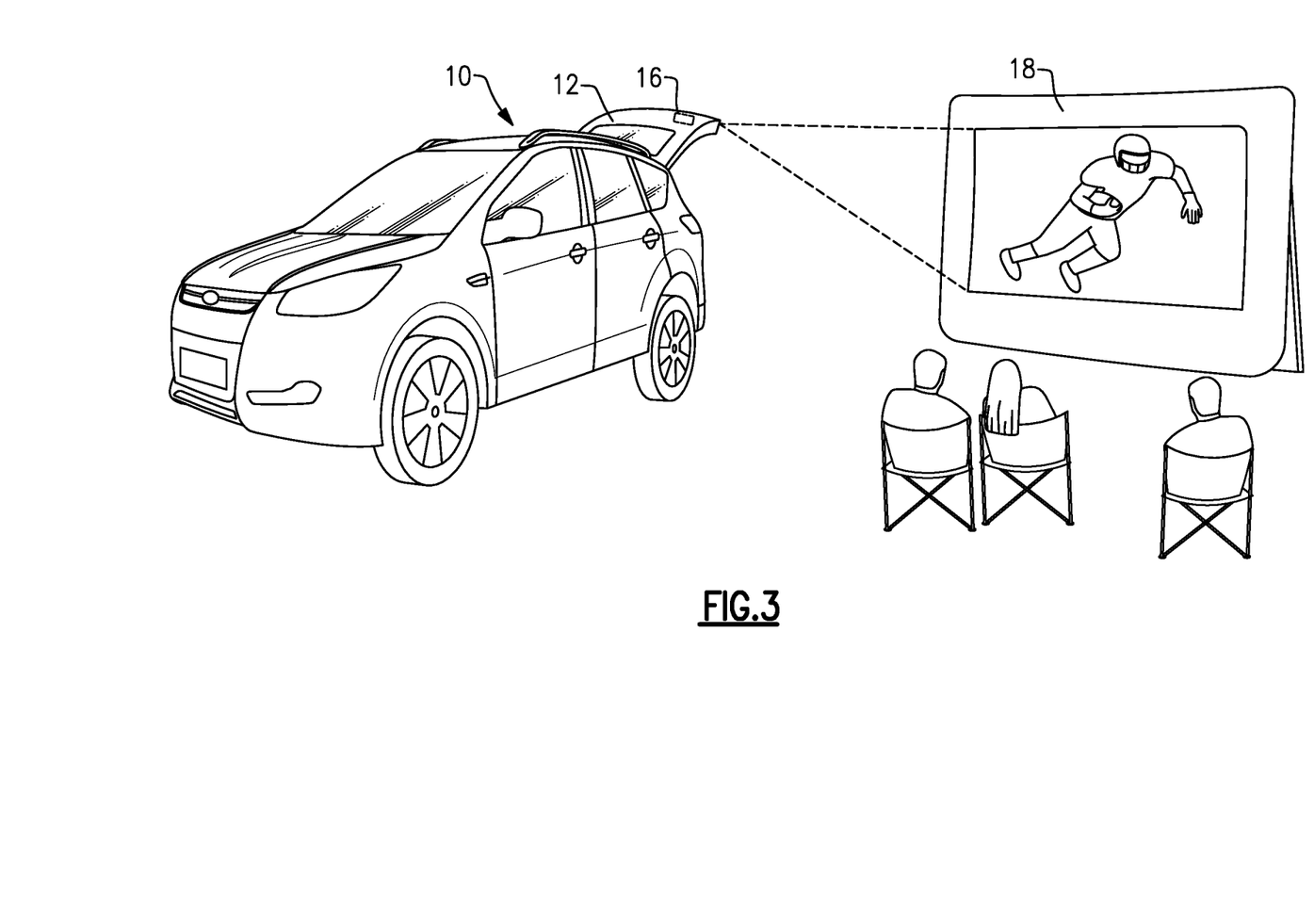
FIG. 3 illustrates the vehicle of FIGS. 1 and 2 with a video projector being used in a video projection mode, in which the video projector projects video onto a screen.

In this example, a video projector 16 is mounted to the liftgate 12 of the vehicle 10. The video projector 16 may be configured to project video in high definition, such as in 1080p. As shown in FIG. 2, when the liftgate 12 is in the fully open position, the video projector 16 is configured to project video in a generally rearward direction, away from the vehicle 10. As shown in FIG. 3, the video projector 16 can be used to project video on a screen 18, which could be a stand-alone screen or a surface of a wall, as examples. The video projector 16 essentially turns the vehicle 10 into an entertainment accessory, and allows users to play movies and other videos during tailgate parties, camping trips, etc. The video projector 16 is not only capable of projecting video, however, and may function in one or more secondary modes, as will be discussed below.

Turning back to FIG. 1, the liftgate 12 is rotatably coupled to the vehicle body 14 adjacent an upper edge 20 of the liftgate 12. The video projector 16 is mounted to the liftgate 12 adjacent a lower edge 22 of the liftgate 12, in this example. The lower edge 22 is adjacent a lower portion of the vehicle body 14, which in this example is a rear bumper 24 of the vehicle 10. Thus, when the liftgate 12 is in the fully open position (as shown in FIG. 2), the video projector 16 is configured to project video generally rearwardly and away from the vehicle 10. In particular, the video projector 16 is mounted to the liftgate 12 such that video projects in a direction substantially parallel to a ground surface when the liftgate 12 is in a fully open position. In other examples, the video projector 16 can project video at a different angle. For example, the fully open position of the liftgate 12 can be adjusted to project video at a desired angle.

The video projector 16 is electrically coupled to a controller 26 in this example. The controller 26 is shown schematically in FIG. 1. It should be understood that the controller 26 could be part of an overall vehicle control module, such as a vehicle system controller (VSC), or could alternatively be a stand-alone controller separate from the VSC. The controller 26 may be programmed with executable instructions for interfacing with and operating the various components of the vehicle 10. Further, the controller 26 includes a processing unit and non-transitory memory for executing the various control strategies and modes of the vehicle system.

In one example, the controller 26 is electrically coupled to a vehicle infotainment system 28, which is shown schematically in FIG. 1. In another example, the controller 26 is integrated into the vehicle infotainment system 28. It should be understood the vehicle infotainment system 28 is compatible with various types of media, such as radio or television signals, digital video discs (DVD™), Blu-ray Discs™, and media relayed via USB ports, HDMI ports, etc.

In one particular example the vehicle infotainment system 28 is configured to pair with a user's mobile device 30, such as a smartphone, by a connection 32, which can either be a wired or wireless connection, such as a Bluetooth® connection. While a smartphone is shown, the mobile device 30 could be another type of mobile computing device, such as a tablet or laptop. Alternatively, the mobile device 30 can be connected via the connection 32 to the controller 26 directly.

The user interface for the video projector 16 is provided by the vehicle infotainment system 28 and/or the mobile device 30. Additionally, video content from the vehicle infotainment system 28 or the mobile device 30 can be played through the video projector 16. It should be understood that audio associated with such video content can be played through speakers of the vehicle 10.

The video projector 16, the controller 26, and the vehicle infotainment system 28 can be powered by a battery of the vehicle 10. Thus, the vehicle 10 provides a portable video projector that is not required to be connected to a generator or an electrical grid in order to function. In one example of this disclosure, as the video projector 16 draws on the vehicle battery, the controller 26 is configured to send an alert to the mobile device 30 when the vehicle battery state of charge (SOC) falls below a predetermined threshold. The threshold may be 50% SOC in one example. Upon receipt of the alert, the user can take a corrective measure, such as turning on the internal combustion engine of the vehicle 10, if present, or plugging the vehicle 10 into the grid, if the vehicle is a plug-in hybrid electric vehicle (PHEV) or a battery electric vehicles (BEV), for example.

As mentioned above, the video projector 16 may be used in one or more secondary modes. Since the video projector 16 may be used in connection with outdoor activities, such as tailgating and camping, additional functionality may be desirable. As discussed above, the video projector 16 is operable in a video projection mode in which the video projector projects video. But further, the video projector 16 is also operable in a secondary mode in which the video projector does not project video. The video projector 16 is operable in the secondary mode upon receipt of instructions from the controller 26, the vehicle infotainment system 28, or the mobile device 30.

Figure 4:
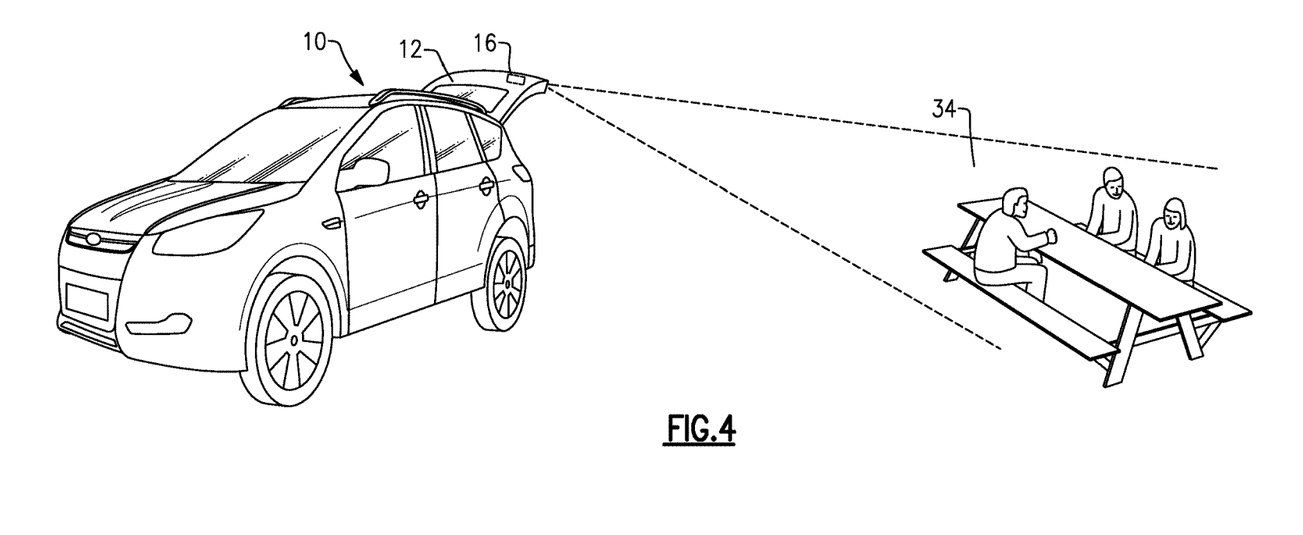

In one example secondary mode, shown in FIG. 4, the video projector 16 may be used as a floodlight. In FIG. 4, the video projector 16 is used to cast a relatively white light in a direction away from the vehicle 10, and to substantially illuminate a space 34 adjacent the vehicle 10. In this example, the video projector 16 is used to illuminate a space near a picnic table, allowing the users to dine outside with ample light.

Figure 5:
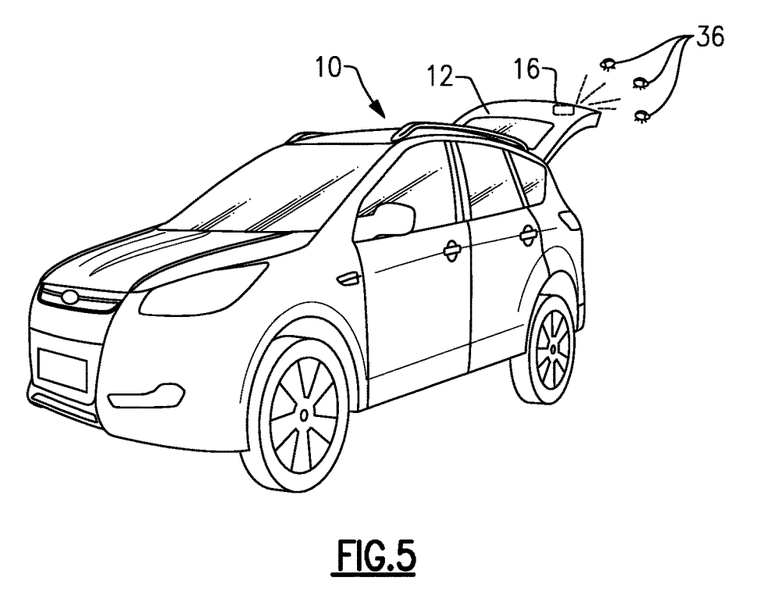

In another example secondary mode, shown in FIG. 5, the video projector 16 may be used as an insect-attracting light. In FIG. 5, the video projector 16 is used to cast a substantially yellow light, which is a color attractive to insects 36, such as mosquitoes and moths. As such, insects 36 in the area adjacent the vehicle 10 will be drawn to the video projector 16, rather than being a nuisance to the people near the vehicle at a tailgate party or campsite, for example. Further, as will be described below, the video projector 16 could include electrically conductive material, which may act as a bug zapper (more formally known as an electric insect killer). While two example secondary modes have been described, the video projector 16 could be used in other secondary modes.

Figure 6:
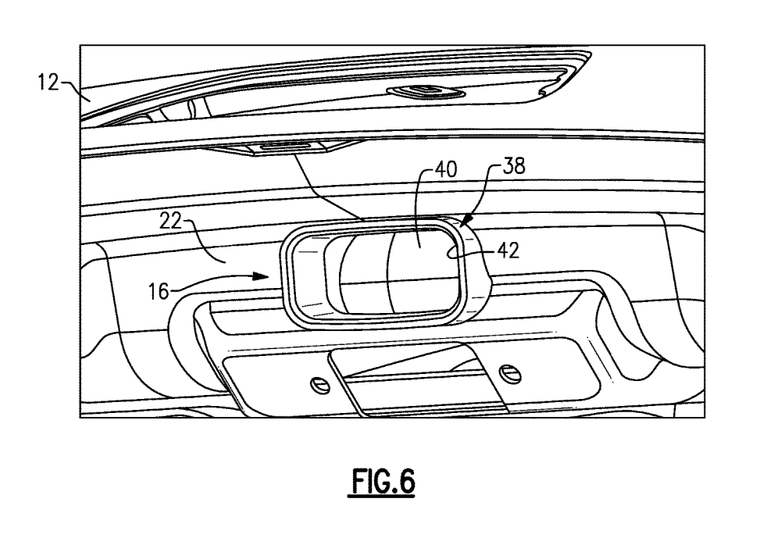
FIG. 6 is a perspective view of a video projector mounted to a liftgate.
Figure 7:
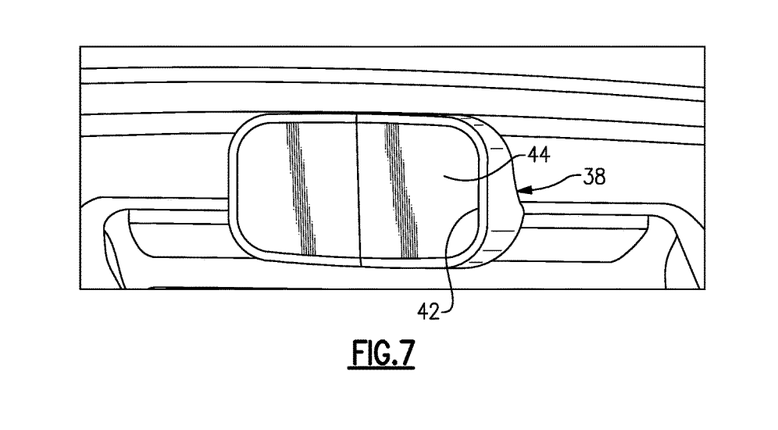
FIG. 7 is a view of a cap covering a lens of the video projector of FIG. 6.

FIG. 6 is a close-up view of the lower edge 22 of the liftgate 12, and illustrates additional detail of the video projector 16. In this example, the video projector 16 includes a bezel assembly 38 surrounding and supporting a lens 40. The lens 40 is recessed inward from an opening 42 defined by the bezel assembly 38. Thus, the bezel assembly 38 protects the lens 40 when the video projector 16 is not in use. Optionally, a cap 44 may be placed over the opening 42 to further protect the lens 40 when the video projector 16 is not in use, as shown in FIG. 7.

Figure 8:
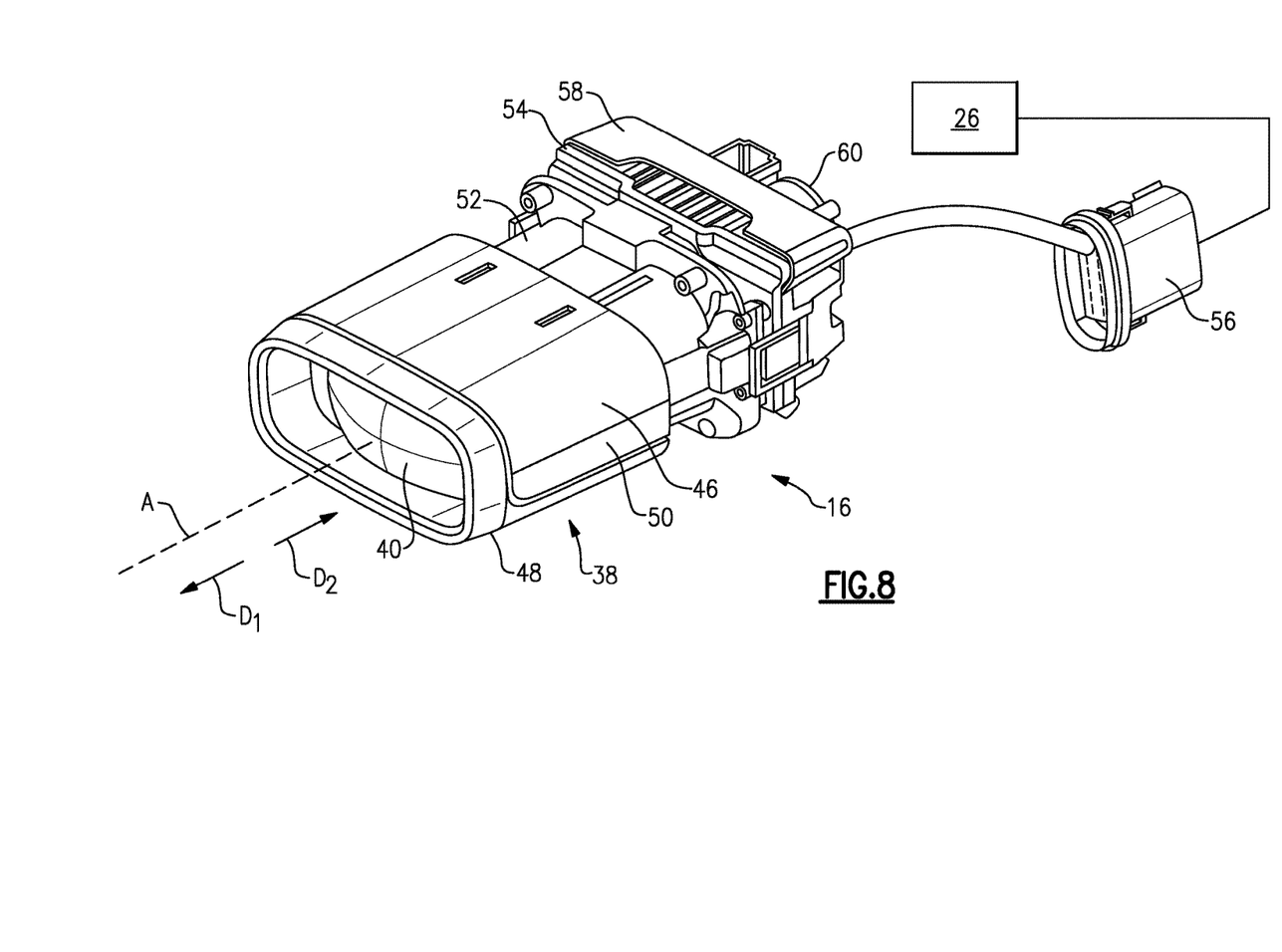
FIG. 8 is a perspective view of the video projector of FIG. 6 without showing the liftgate.

FIG. 8 illustrates the detail of the video projector 16 without the liftgate, for ease of reference. As shown in FIG. 8, the bezel assembly 38 includes a bezel 46 and a lens cover 48. The bezel 46 may include an electrically conductive material 50 along at least one surface thereof. The electrically conductive material 50 may act as a bug zapper, especially when the video projector 16 is used as an insect-attracting light, as described relative to FIG. 5. To this end, the bezel assembly 38 may be at least partially coated with a phosphor coating to attract insects to the video projector 16. Other insect-attracting coatings can also be used. The electrically conductive material 50 may also be used to complete an electrical connection within the vehicle 10, as will be described below.

Further, the video projector 16 includes a lens holder 52 provided at least partially within the bezel 46. In this example, the bezel assembly 38 and the lens holder 52 extend along an axis A, and the bezel assembly 38 is configured to move along the axis A relative to the lens holder 52 in directions $D_1$, $D_2$, which are parallel to the axis A. Movement of the bezel assembly 38 focuses video by adjusting the position of the lens 40, and is further used to store the video projector 16 and protect the lens 40 when the liftgate 12 is in the closed position, as will be described below.

The video projector 16 further includes a projector assembly 54, which is configured to project video toward the lens 40, and includes one or more actuators configured to adjust the position of the bezel assembly 38 relative to the lens holder 52. The bezel assembly 38 could be moveable relative to the lens holder 52 in another manner, and this disclosure is not limited to a projector assembly 54 having one or more actuators. Further, the projector assembly 54 is electrically coupled to the controller 26 via an interface 56. The video projector 16 also includes a fan mount 58 mounted to the projector assembly 54 opposite the lens holder 52, and a fan 60 mounted to the fan mount 58.

Figure 9:
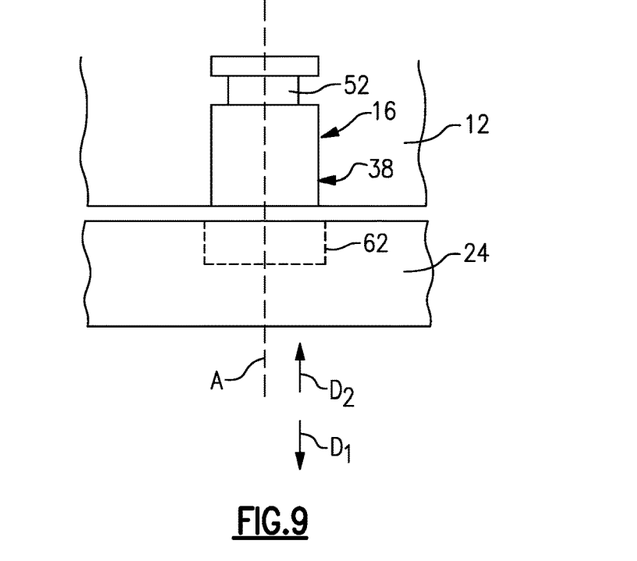
FIG. 9 schematically illustrates the video projector in a use position within a liftgate.
Figure 10:
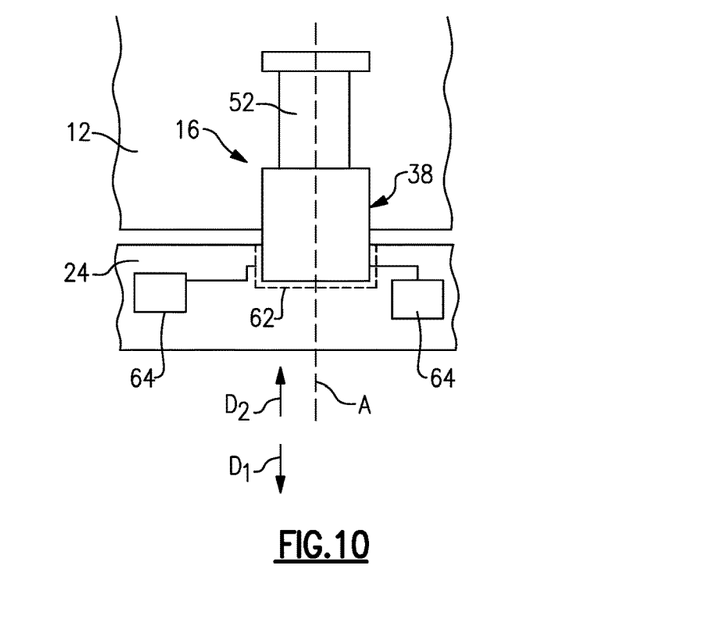
FIG. 10 schematically illustrates the video projector in a storage position, wherein a portion of the video projector is in a recess in a rear bumper.

FIGS. 9 and 10 schematically illustrate example movements of the bezel assembly 38 relative to the liftgate 12. FIG. 9 schematically illustrates the video projector 16 when the liftgate 12 is in a use position. In the use position, the liftgate 12 is capable of opening and closing, and thus deploying the video projector 16, because the bezel assembly 38 is provided within the liftgate 12 and does not contact the rear bumper 24.

FIG. 10, on the other hand, schematically illustrates the video projector 16 in a storage position. In the storage position, the liftgate 12 is closed and the bezel assembly 38 has traveled along the axis A in the direction $D_1$ into a recess 62 in the rear bumper 24. Thus, the bezel assembly 38 and the lens 40 are received in the recess 62. The recess 62 may be a sealed recess, including an elastomeric seal configured to prevent dirt, salt, etc., from entering the recess 62 and damaging the lens 40. When the user desires to open the liftgate 12, the bezel assembly 38 is retracted out of the recess 62 in the direction $D_2$, back to the position of FIG. 9.

In one example of this disclosure, the rear bumper 24 may include one or more electronic components 64. Example electronic components include rear fascia lighting or sensors, among others. When the bezel assembly 38 is received in the recess 62, the bezel assembly 38 completes an electrical connection with the electronic components 64. In one example, the electrical connection is completed, in part, by the electrically conductive material 50 on the bezel assembly 38, and corresponding electrically conductive material adjacent the recess 62. The electronic components 64 may be controlled by the controller 26, or may be controlled in another manner. For example, it may be desirable to activate the electronic components 64 every time the liftgate 12 is closed. In that case, the electronic components 64 are activated every time the electrically conductive material 50 completes the electrical connection with the conductive material in the recess 62.

Figure 11:
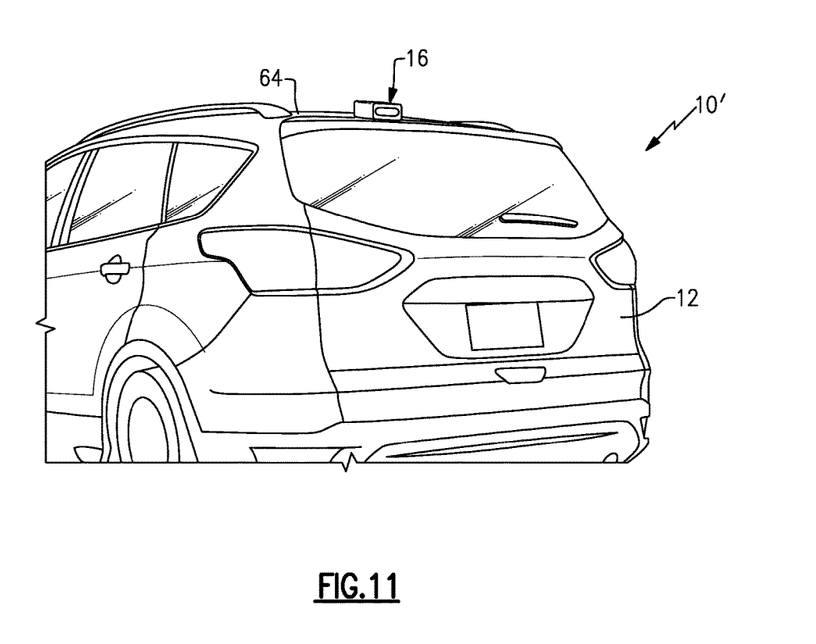
FIG. 11 is a rear-perspective view of another example vehicle including a video projector mounted to a roof of the vehicle.

FIG. 11 illustrates another example vehicle 10' according to this disclosure. The vehicle 10' includes a video projector 16 mounted to a roof 66 of the vehicle 10'. While the vehicle 10' is an SUV and has a liftgate 12, the vehicle 10' could be another type of vehicle. The video projector 16 in this embodiment has all of the same functionality as the previously-discussed embodiment, including being operable in a video projection mode in which the video projector 16 projects video and a secondary mode in which the video projector does not project video.

In addition to being capable of functioning as a floodlight, such as in the embodiment of FIG. 4, and as an insect-attracting light, as in the embodiment of FIG. 5, the video projector 16 is further configured to function as a signaling light while the vehicle 10' is in operation. For example, the video projector 16 may be configured to cast a substantially red light to indicate a vehicle braking operation. The video projector 16 may also be configured to cast a white light to indicate the vehicle is in reverse. Additionally, the video projector 16 may act as a turn signal. This disclosure is not limited to these particular signaling lights. Further, it should be understood that the video projector 16 could be used in other secondary modes.

It should be understood that terms such as "about," "substantially," and "generally" are not intended to be boundaryless terms, and should be interpreted consistent with the way one skilled in the art would interpret those terms. Further, terms such as "rearward," "upper," and "lower" are used herein for purposes of explanation only, and refer to the normal operational attitude of a vehicle.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A vehicle, comprising:
   a liftgate rotatable between a closed position and an open position; and
   a video projector mounted to the liftgate, wherein the video projector is configured to project video in a direction away from the vehicle when the liftgate is in the open position.

2. The vehicle as recited in claim 1, wherein the video projector is operable in a video projection mode in which the video projector projects video and a secondary mode in which the video projector does not project video.

3. The vehicle as recited in claim 2, wherein, when in the secondary mode, the video projector projects a light in a direction away from the vehicle body.

4. The vehicle as recited in claim 3, wherein the light is one of (1) a substantially white light configured to illuminate a space adjacent the vehicle and (2) a substantially yellow light configured to attract insects.

5. The vehicle as recited in claim 1, wherein the video projector includes a bezel assembly supporting a lens, and wherein the bezel assembly is moveable relative to the liftgate.

6. The vehicle as recited in claim 5, wherein, when the liftgate is in the closed position, the bezel assembly and lens project from the liftgate into a recess in a portion of the vehicle body.

7. The vehicle as recited in claim 6, wherein the bezel assembly includes electrically conductive material and completes an electrical connection with an electronic component mounted to the portion of the vehicle body.

8. The vehicle as recited in claim 6, wherein the portion of the vehicle body is a rear bumper.

9. The vehicle as recited in claim 7, wherein the bezel assembly includes a phosphor coating to attract insects to the bezel assembly.

10. The vehicle as recited in claim 1, wherein the video projector is powered by a vehicle battery.

11. The vehicle as recited in claim 10, wherein the video projector is controllable by a controller of the vehicle, and wherein a mobile device of a user is in communication with the controller.

12. The vehicle as recited in claim 11, wherein the controller is configured to send an alert to the mobile device when the vehicle battery state of charge is below a threshold.

13. The vehicle as recited in claim 12, wherein the mobile device is a smartphone.

14. A vehicle, comprising:
    a roof; and
    a video projector mounted to the roof and configured to project video in a direction away from a vehicle body, wherein the video projector is operable in a video projection mode in which the video projector projects video and a secondary mode in which the video projector does not project video, wherein, when in the secondary mode, the video projector projects a light in a direction away from the vehicle body.

15. The vehicle as recited in claim 14, wherein the light is one of a reverse light and a brake light.

16. The vehicle as recited in claim 14, wherein the light is one of (1) a substantially white light configured to illuminate a space adjacent the vehicle and (2) a substantially yellow light configured to attract insects.

17. A method, comprising:
    rotating a liftgate of a vehicle to an open position; and
    projecting video from a video projector mounted to the liftgate in a direction away from the vehicle.

18. The method as recited in claim 17, further comprising:
    operating the video projector in a secondary mode in which the video projector does not project video, and wherein, when in the secondary mode, the video projector projects one of (1) a substantially white light configured to illuminate a space adjacent the vehicle and (2) a substantially yellow light configured to attract insects.

19. The method as recited in claim 17, further comprising:
    rotating the liftgate to a closed position; and
    extending a bezel assembly and lens of the video projector from the liftgate into a recess in a rear bumper of the vehicle.

* * * * *